United States Patent
Neto et al.

[11] Patent Number: 6,003,558
[45] Date of Patent: Dec. 21, 1999

[54] SYSTEM FOR LOCKING FILLER CAPS

[75] Inventors: Manoel Antonio Dutra Rodrigues Neto; Rogério de Araujo Sacchi, both of Sao Paolo, Brazil

[73] Assignee: Locktron Ind. E Com. LTDA, Sao Paolo, Brazil

[21] Appl. No.: 09/043,869

[22] PCT Filed: Sep. 21, 1995

[86] PCT No.: PCT/BR95/00040

§ 371 Date: Aug. 21, 1998

§ 102(e) Date: Aug. 21, 1998

[87] PCT Pub. No.: WO97/11305

PCT Pub. Date: Mar. 27, 1997

[51] Int. Cl.$^6$ ..................... F16L 55/10
[52] U.S. Cl. .............. 138/89; 220/314; 138/96 R
[58] Field of Search ................ 138/89, 96 R; 220/210, 314, 323

[56] References Cited

U.S. PATENT DOCUMENTS

| | | | |
|---|---|---|---|
| 2,946,215 | 7/1960 | Eshbaugh et al. | 70/169 |
| 3,672,403 | 6/1972 | Wilson et al. | 138/89 |
| 3,722,549 | 3/1973 | Wilson et al. | 138/89 |
| 3,907,155 | 9/1975 | Smith et al. | 220/210 |
| 4,351,446 | 9/1982 | Madden | 220/210 |

*Primary Examiner*—Patrick Brinson
*Attorney, Agent, or Firm*—Abelman, Frayne & Schwab

[57] ABSTRACT

A system for locking caps, to be used especially in those tanks containing inflammable liquids, said cap (10) comprising a body (11) which is seated over a tank nozzle (2), an articulating lock arm (14) bearing a respective lock displaceable between locking and releasing positions relative to the tank nozzle upon the corresponding angular movement of the lock arm, an arm activating assembly provided in the cap body (11) and whereto a drive shaft (51) is mounted in a freely rotating manner and to which torque is selectively applied, an impelling piston (15) coupled to lock arm (14) and being axially displaced between corresponding locking and releasing positions of the lock arm (14); an electromagnetic clutch causing the selective axial displacement of the impelling piston (15) between operational limit positions upon the rotation of the drive shaft (51) and comprising a coupling means displaceable between engaging and disengaging position; coil means (60) causing the displacement of the coupling means to the engaging position, an electronic switch (40) provided with a primary transformer (L1) coupled to a secondary transformer (L2) mounted on the cap body (11) and including in the secondary transformer enough current to operatively energize the coil means (60).

11 Claims, 5 Drawing Sheets

SYSTEM FOR LOCKING FILLER CAPS

A SYSTEM FOR LOCKING FILLER CAPS

FIELD OF THE INVENTION

The present invention refers to a lock system for the filling caps of closed tanks, especially those tanks containing inflammable liquids such as the fuel tanks of service (gas) stations.

BACKGROUND OF THE INVENTION

Fuel supply to service stations takes place upon the arrival of the transporting tanker truck, when each tank of said service stations is opened.

The filling is achieved by removing the filling cap at the feeding nozzle of the fuel tank, which opens toward the surface of the service station and through which a suitable conducting element, such as a hose, is introduced, providing a temporary fluid communication between the reservoir of the tanker truck and the tank of the service station. The removal of the filling cap is achieved by the easy opening of a conventional padlock, which hinders the movement of the cap lock arms and retains the cap against the nozzle of the tank.

Due to the easy access to the inside of the service station tanks, resulting from the precarious closing system thereof, the contents of said reservoirs are liable to composition adulterations, such adulterations being difficult to prove.

One solution for this problem is to provide the tank filling caps with closing and locking systems which are electrically activated at well determined time periods. Nevertheless, said solution cannot be applied to fuel tanks, due to the danger of explosion caused by electrical sparks, which may occur in this type of lock systems.

Moreover, even though the electrically activated systems present the most elaborate closures in the state of the art, they are still easily activated by conventional electric connectors, which leave no trace of having had the tank cap removed at times which are not solely for the purpose of supplying the tank.

DISCLOSURE OF THE INVENTION

Thus, it is an object of the present invention to provide a lock system for the filling caps of closed tanks which can deny access to the inside of said tanks between supply periods of time.

Another object of the present invention is to provide a lock system such as that cited above, which does not pose risks, as for example explosions, to those environments in which said reservoirs to be locked are located.

These and other objectives are reached through a lock system for the filling caps of closed tanks, especially those tanks containing inflammable liquids, said cap comprising: a body seated over the respective tank nozzle and articulating at least one lock arm, bearing a respective lock which can be displaced between the locking and releasing positions in relation to the nozzle, when there is a corresponding angular movement of the lock arm, said system further comprising an arm activating assembly provided in the cap body and including a drive shaft, mounted axially on the cap body in a freely rotating manner and having an end which is accessible on the outside of the cap and to which a torque tool is selectively applied; at least one impelling piston, mounted axially through the cap body, so that one outer end may be coupled to the lock arm and the opposite inner end to the filling cap, each impelling piston being axially displaced between a first position corresponding to the lock arm locking position and a second position corresponding to the lock arm releasing position; at least one electromagnetic clutch, mounted to the cap body, so as to cause the selective axial displacement of the impelling piston between the first and second operational limit positions thereof when the drive shaft rotates, said clutch comprising a coupling means, which is displaced between an engaging position, in which the rotation of the drive shaft causes the axial displacement of the impelling piston and a disengaging position, in which the drive shaft rotates freely upon torque application; at least one coil means coupled to the cap body, so as to cause, when energized, the displacement of the coupling means toward the engaging position; an electronic switch provided with a transformer primary (L1) energized at low power and coupled to a transformer secondary (L2) mounted on the cap body, so as to induce in the transformer secondary (L2) enough current to operationally energize the coil means of the electromagnetic clutch.

BRIEF DESCRIPTION OF THE DRAWINGS

The invention will be described below, based on the attached drawings, in which.

BEST MODE FOR CARRYING OUT THE INVENTION

Figure 1:
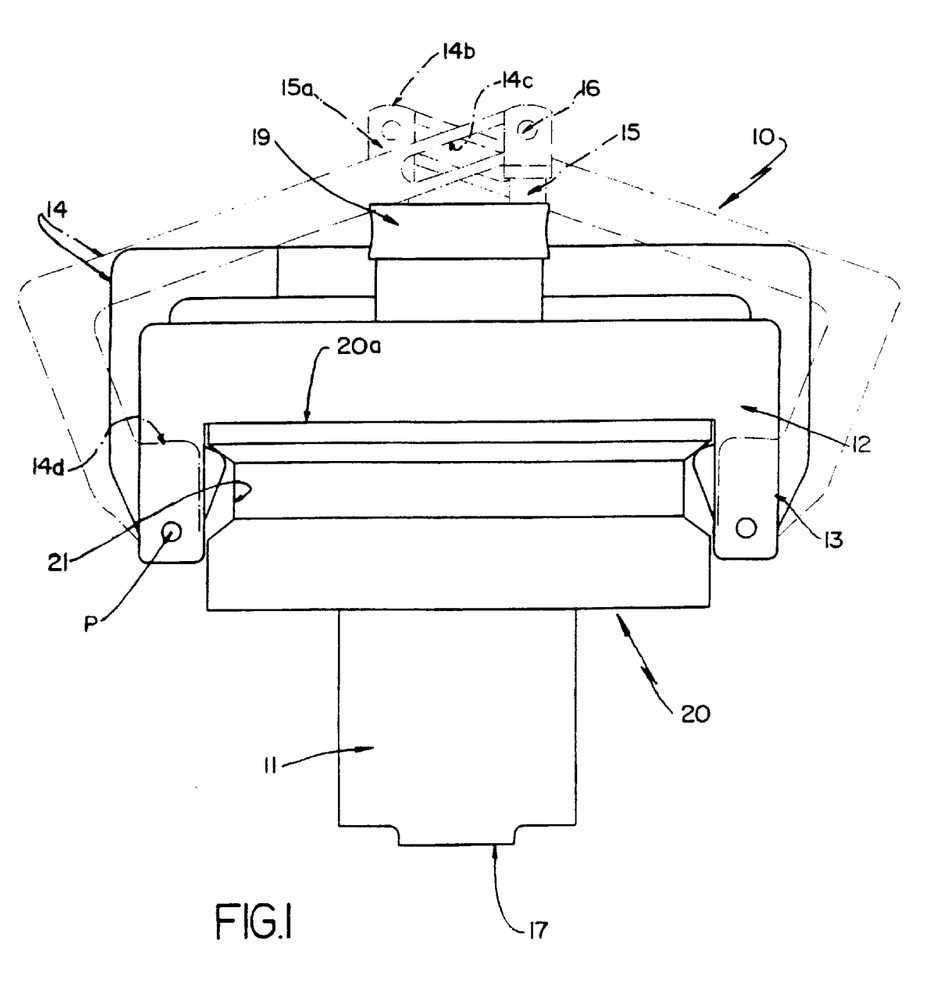
FIG. 1 schematically illustrates a filling cap according to the present invention, which is mounted onto the tank nozzle in the closed cap position and in the open cap position (dashed lines)
Figure 2:
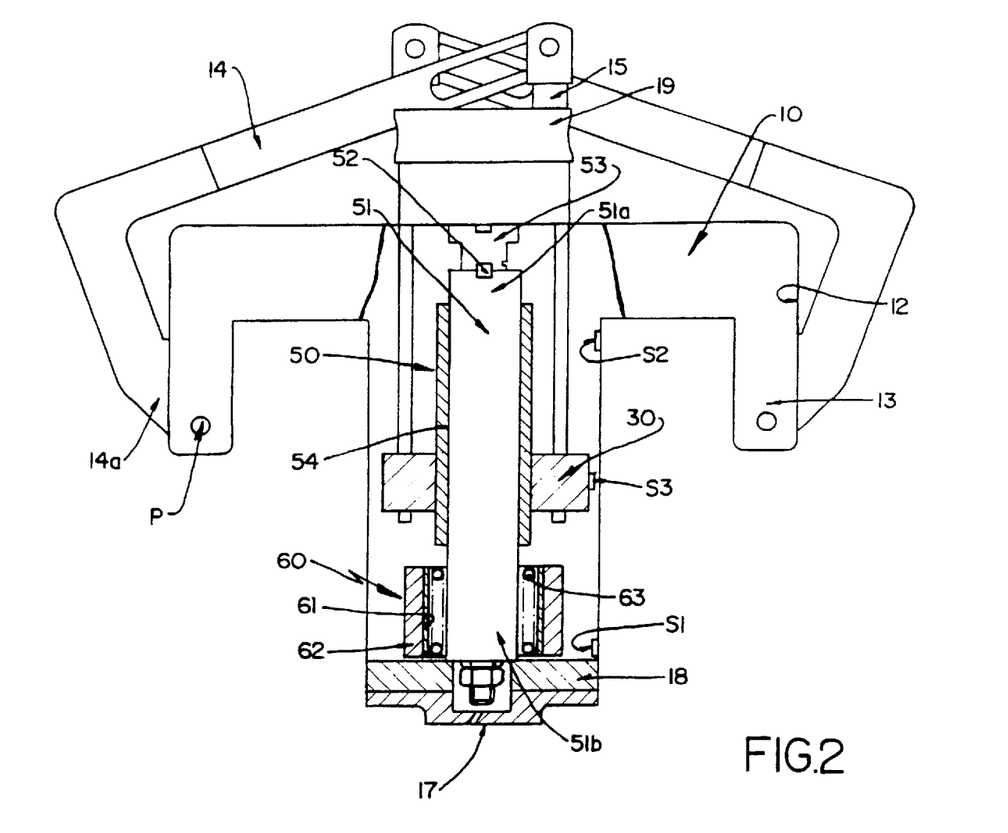
FIG. 2 schematically illustrates the cap of FIG. 1 in an open state and provided with the lock system of the present invention.
Figure 3:
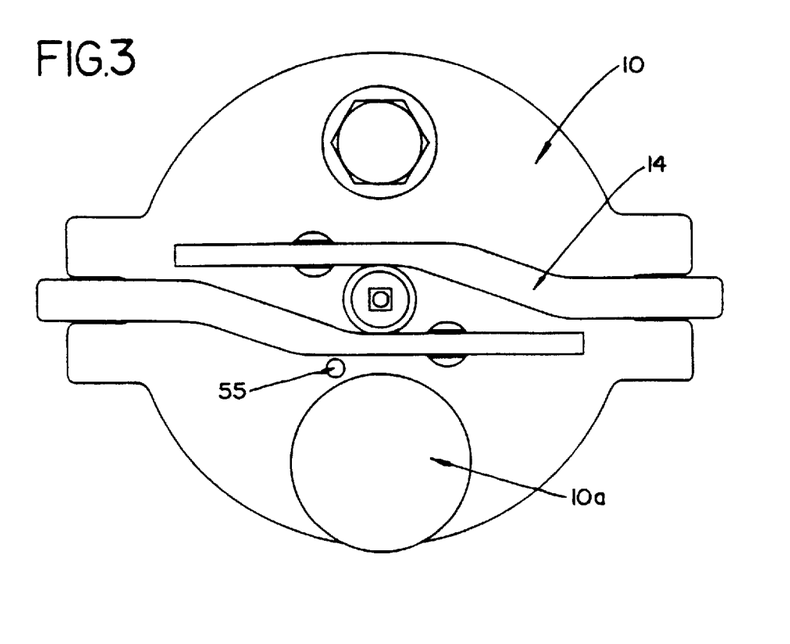
FIG. 3 is a schematic top plan view of the filling cap of the present invention.

According to the figures presented, the lock system of the present invention comprises a filling cap 10 for the closure of a feed nozzle 20, which is disposed at an upper wall portion of a tank (not illustrated) and which is constructed under the surface of a service station. Said feed nozzle 20 presents an access end 20a facing said surface and an opposite end (not illustrated), facing the inside of the reservoir. The access end 20a is in the form of a body, which projects from a recessed portion of said surface and which is concentric to said nozzle, the profile of which being defined so as to receive and retain the filling cap 10. The height of the projecting portion of said access end 20a over the lower surface of said recess is such that, in the tank closed position, the filling cap 10 is substantially coplanar with the surface of the service station.

The filling cap 10 is "T" shaped, having a cap body 11 of the closed and substantially cylindrical type and bearing, at one end, a head portion 12, from which peripheral edge there is downwardly projected a peripheral skirt 13 whereto there is mounted, in a suitable manner, such as by tempered pins P, at least one, but preferably a pair of lock arms 14, which are diametrically opposite to each other and mounted to the peripheral skirt 13, by means of the respective articulated end 14a. The opposite end 14b of each of said lock arms 14 is mounted to a corresponding impelling piston 15 of an arm activating assembly, which is axially displaced through the inside of the cap body 11 between a first position corresponding to the lock arm locking position and achieved by the engagement of a locking portion of each lock arm 14 to the tank feed nozzle, and a second position corresponding to the lock arm releasing position. In the preferred construction, lock arms 14 may also be in a partially open state. The assembly of the opposite end 14b of each lock arm 14 to the respective impelling piston 15 takes place by the sliding fit of a guide pin 16, which is provided at a free end 15a of each said impelling piston 15 and which projects from a side wall of said piston, orthogonally to the axis thereof. Said guide pin 16 is engaged in a lateral slot 14c, preferably a through slot, which is axially defined at the opposite end 14b of each said lock arm 14 and through which each said guide pin 16 slides when there is an opening or a closing movement of filling cap 10.

In the illustrated construction, the cap body 11 is closed at one of the ends thereof, by a bottom cap 17 supporting in its face internal to said cap body 11 a supporting base 18 of the lock system of the present invention, to be described later.

When in the locking position, an engaging portion 14d at the articulated end 14a of each lock arm 14 fits into a restricted annular region 21 of the projecting end of the feed nozzle 20, until the opening of the filling cap 10 has been commanded, when the movement of each impelling piston 15 withdraws said engaging portions 14d, unlocking said filling cap 10 from the feed nozzle 20.

Each impelling piston 15 further presents an opposite end 15b, which is internal to the cap body 11 and which is affixed by a pinion 30 internally screwed on and which acts in the opening and closing movements of the filling cap 10.

According to the present invention, the arm activating assembly further includes, mounted on the inside of cap body 11, an electromagnetic clutch which, when activated by an electronic activating switch 40 mounted on a tanker truck, not illustrated, causes the selective axial displacement of the impelling piston 15, between the first and second operational positions thereof and allows for the opening and closing of said filling cap 10. The electronic switch 40 is powered by the tanker tank battery by means of suitable cables C and connected to the filling cap 10 in an engaging portion 10a thereof and upon the opening of said filling cap 10 is maintained in this state of connection until the closure of said filling cap 10 has been effected. The electronic switch 40 is programmed, so that after a determined average time interval for the filling operation has elapsed, it de-energizes the filling cap 10, avoiding the replacement thereof in the reservoir nozzle. In this state, only a technician can reinstate normal use conditions. Said electronic activating switch 40 comprises a transformer primary L1 energizable at low power; at least one manual activating button 42, by which the operator can command the end of the open or closed states of the filling cap 10 when, for any reason, the electronic switch 40 detects the filling cap 10 to be in a partially open state; and at least one audio visual signal 43, which indicates to the operator the end of the opening or closing operations of the filling cap 10, obtained by a command from the electronic switch 40 or when its coupling to said filling cap 10 has not been accomplished. The electronic activating switch 40 includes at least one electromagnetic communicating element, preferably a first optic transmitter T1 and a first optic receptor R1, which communicate respectively with a second optic receptor R2 and a second optic transmitter T2 provided in the engaging portion 10a.

The arm activating assembly further comprises a drive shaft 51, which is axially disposed through the inside of the cap body 11 and concentric to the filling cap axis, having an end 51a mounted on the supporting base 18 and an opposite end 51b engaged, by means of key 52, to an activating element 53, which receives on a face external to the filling cap 10 a torque tool, such as a manual crank (not illustrated), by which the user selectively moves said filling cap when it has been released from the action of the electromagnetic clutch.

The electromagnetic clutch further comprises a coupling means displaceable between an engaging position in which a turn of the drive shaft causes the axial displacement of the impelling piston, and a disengaging position, in which the drive shaft rotates freely when there is torque application thereon, this coupling means including a transmitting means having an endless means in the form of an endless screw tubular element 54, and a pinion 30, which involves the drive shaft 51, so as to enable it to present only rotational movement and whose external threaded surface permits the axial movement of pinion 30 between a cap closed position defined when said pinion 30 is located near the supporting base 18, and an open cap position, when said pinion 30 is adjacent to the end portion of the cap body 11, opposite to the supporting base 18. The filling cap 10 of the present invention is provided in the inner portion of cap body 11 thereof, with at least one first and one second position sensors S1, S2, arranged axially removed one from the other in order to sense the presence of pinion 30 in the closed cap and open cap positions. In the preferred illustrated construction, these sensors are electronic sensors of the "Hall" type which detect the presence of a corresponding emitter S3 of this system, provided in an external wall portion of pinion 30 and adjacent to said sensors.

The coupling means further includes adjacent to each end of the drive shaft 51, a respective coil means 60 which, when energized, causes the magnetic coupling between the drive shaft 51 and the endless screw tubular element 54, to permit the axial displacement of pinion 30 through the inside of cap body 11, and consequently the movement of lock arms 14 between the open and closed cap positions.

Each coil means 60 comprises a preferably cylindrical tubular sleeve 61, which concentrically involves a respective end portion of drive shaft 51 and the adjacent end of the endless screw element 54, and which is spaced from said parts and supported on an appropriate supporting base mounted on the cap body 11.

External to the tubular sleeve 61 there is arranged a coil 62, which is energized upon the coupling of the switch element 40 to the filling cap 10, so as to originate a magnetic field which induces the coupling and retention of tubular sleeve 61 to said coil 62, impeding the rotational movement of tubular sleeve 61 in relation to the drive shaft 51, when the turning of the latter is caused by the action of the manual crank.

The intensity of the coupling force should be at least sufficient to cause an angular phase displacement between the turn of the drive shaft 51 and the eventual sliding of the tubular sleeve 61 by the coil 62, while the clutch is axially displaced between the open and closed filling cap positions.

The tubular sleeve 61 bears, internally, a helical spring element 63, having one end affixed to said tubular sleeve 61 and the opposite end affixed to the drive shaft 51, said spring element 63 having a sufficient axial length to involve the adjacent end portions of the drive shaft 51 and endless screw element 54.

The usage of two assemblies of coil means 60 in the preferred solution is due to having spring torque in only one turning direction. The spring does not "adhere" in the opposite direction.

When coupling the electronic switch 40 to the filling cap 10, first transmitter T1 of the electronic switch 40 informs the second receptor R2 of the filling cap 10 that the coupling between said parts has been accomplished and the first optic receptor R1 of said electronic switch 40 then receives the information regarding the characteristics and conditions of the coupled filling cap 10 by means of the second transmitter T2 thereof. These features will be compared with the characteristics and conditions, which are expected for this cap and which have been previously informed to a central processing unit (described later on) provided in the electronic switch 40, before said unit commands the unlocking operation for opening the filling cap 10. If all information is in agreement, the electronic switch 40 begins to unlock the electromagnetic lock mechanism, releasing the cap 10 so that it may be opened manually.

In order to release cap 10 from the electromagnetic lock, the primary L1 of transformer 41 in the electronic switch 40 is energized, producing a magnetic field which induces a current in a transformer secondary L2 provided in filling cap 10.

This current energizes coil 62, originating a magnetic field which retains tubular sleeve 61 against the surface of said coil, avoiding the rotational movement of said sleeve upon the rotation of the drive shaft of said sleeve upon the rotation of the drive shaft 51. While in the locking condition, the torque to the drive shaft 51 causes the free rotation of the tubular sleeve 61 through the coupling thereof to said drive shaft 51 by the spring element 63.

When the coil 62 retains the tubular sleeve 61, the turning of the drive shaft 51 causes torsion on spring element 63 which, as it decreases the diameter of the coils thereof, conducts the contact and the adhesion of said spring element 63 to the adjacent ends of the drive shaft 51 and endless screw 54, permitting the transfer of rotational movement from said drive shaft 51 to said screw element.

Figure 4:
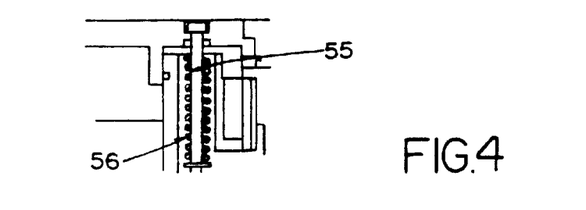
FIG. 4 schematically illustrates a lock pin provided in the cap body.

The rotation of the endless screw 54 is then transmitted to pinion 30 as a linear movement, in order to allow the axial displacement thereof and of the impelling pistons 15, in order to open filling cap 10. During the opening movement of filling cap 10, pinion 30 is induced to make contact, on the front surface thereof, with the first end of a lock pin 55 mounted on the inside of cap body 11, the second end being opposite to the first end and projecting from the cap outer surface, preferably parallely to the drive shaft 51 of said cap 10 and being fitted into a housing in the form of a slot provided at a coupling end 40a of the electronic switch 40, in order to lock said switch to the filling cap 10 during the opening movement of the latter, until said filling cap is once again closed, avoiding a possible changing of the reservoir cap.

Lock pin 55 is surrounded by a return spring 56, which is located in the cap body 11 and which is elastically deformed between a first compression condition, achieved when cap 10 is opened, defining a maximum spring compression situation, and a second compression condition, achieved when cap 10 is in a closed state, defining a minimum compression situation.

The maximum or minimum compression conditions are reached respectively by pinion 30 getting close to or moving away from the open cap position.

When the clutch reaches the open cap position, electronic switch 40 commands coil 62 of the opening coil means to deenergize.

Tubular sleeve 61 is released and the endless screw 54 returns to a free rotation state, avoiding any change in the open state of pinion 30 and consequently the removal of the electronic switch 40 from the filling cap 10. These conditions will remain until the closing operation of said filling cap 10 has begun.

After the seating of filling cap 10 onto the feed nozzle of the reservoir, the electronic switch 40 is activated and transmitter T1 and receptor R1 elements communicate with corresponding receptor R2 and transmitter T2 elements provided in said filling cap 10, verifying the open state thereof before commanding the energization of coil 62 of the cap closing coil means which, as in the opening operation, causes tubular sleeve 61 to brake, permitting the transmission of the rotational movement of drive shaft 51 to the endless screw 54 and the consequent axial movement of pinion 30 from the open condition to the closed condition of said filling cap 10.

With this movement, lock pin 55 is once again placed in an inoperative condition, retracted to the inside of cap body 11 and releasing the electronic switch 40 from the coupling with filling cap 10. When the closed cap position is reached, the second position sensor S2 informs said state to electronic switch 40, which commands that coil 62 no longer be energized, releasing tubular sleeve 61 to rotate freely.

The opening and closing conditions are communicated to the operator by means of an audio and/or visual signal of a defined duration.

Electronic switch 40 automatically commands the opening and closing of filling cap 10, when the exchange of information between the two indicates that said filling cap 10 is in one of the closing or opening limit positions. If filling cap 10 is in a position between said limit positions, electronic switch 40 will inform the operator, who will decide, by manually activating button 43, the operation to be commanded by electronic switch 40. When filling cap 10 is closed, a cap protecting element 19 is mounted against the engaging portion 16a of said filling cap 10.

In addition to the information regarding the closure of filling cap 10, the optic communication between said cap and the activating electronic switch 40 further informs the latter about the identification of the filling cap 10, the quantity of fuel of the tank on which said cap has been mounted, the date of the last opening thereof, etc.

Electronic switch 40 may be previously programmed to identify a number N of caps per trip of the tanker truck and to store information obtained from these caps for transmission to an information center.

The transmission of energy and the exchange of information between filling cap 10 and the transportation vehicle, in order to cause the locking and unlocking of said filling cap 10, uses electronic circuits, which will be described ahead.

Figure 5:
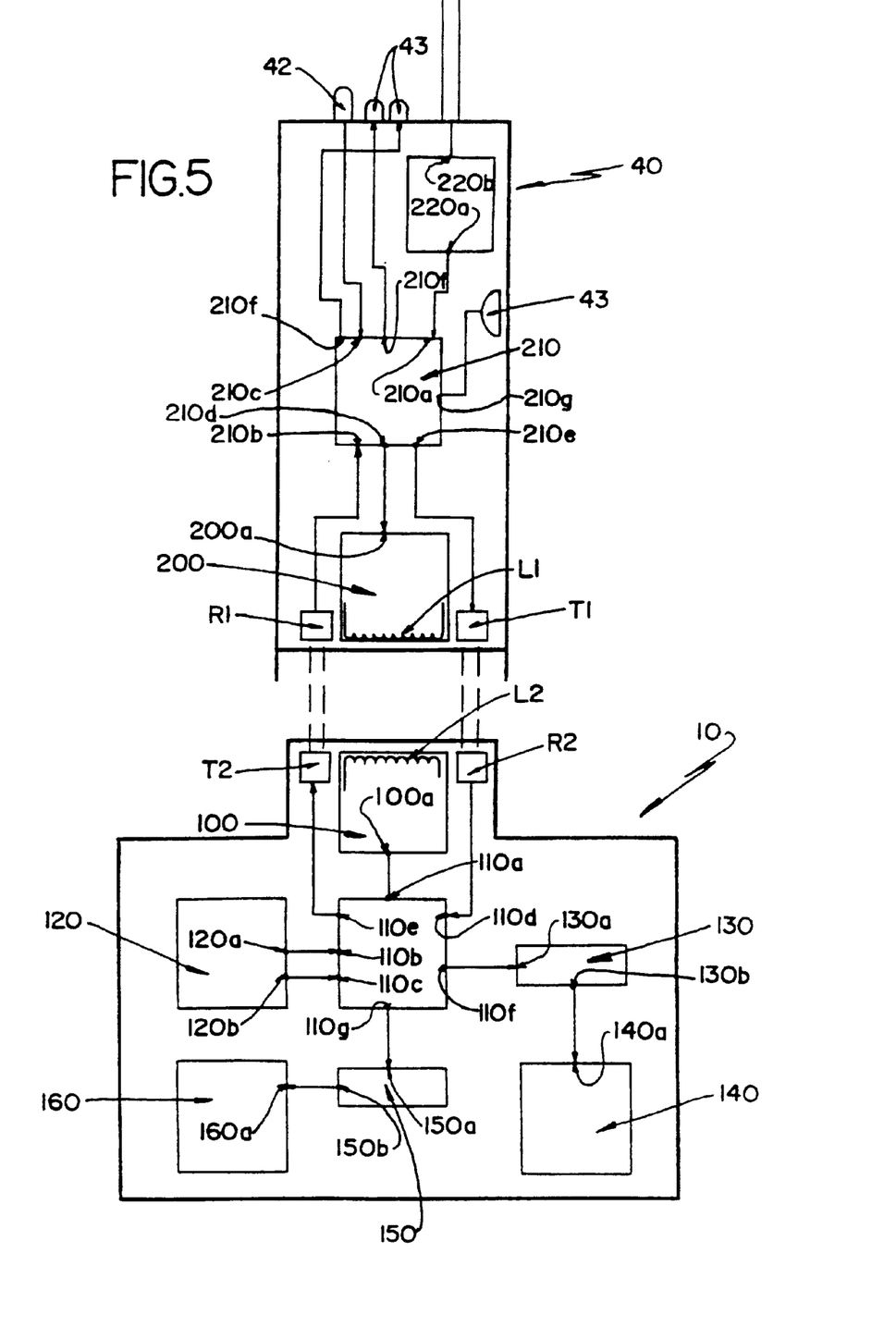
FIG. 5 is a block diagram of the closure system of the present invention.
Figure 6:
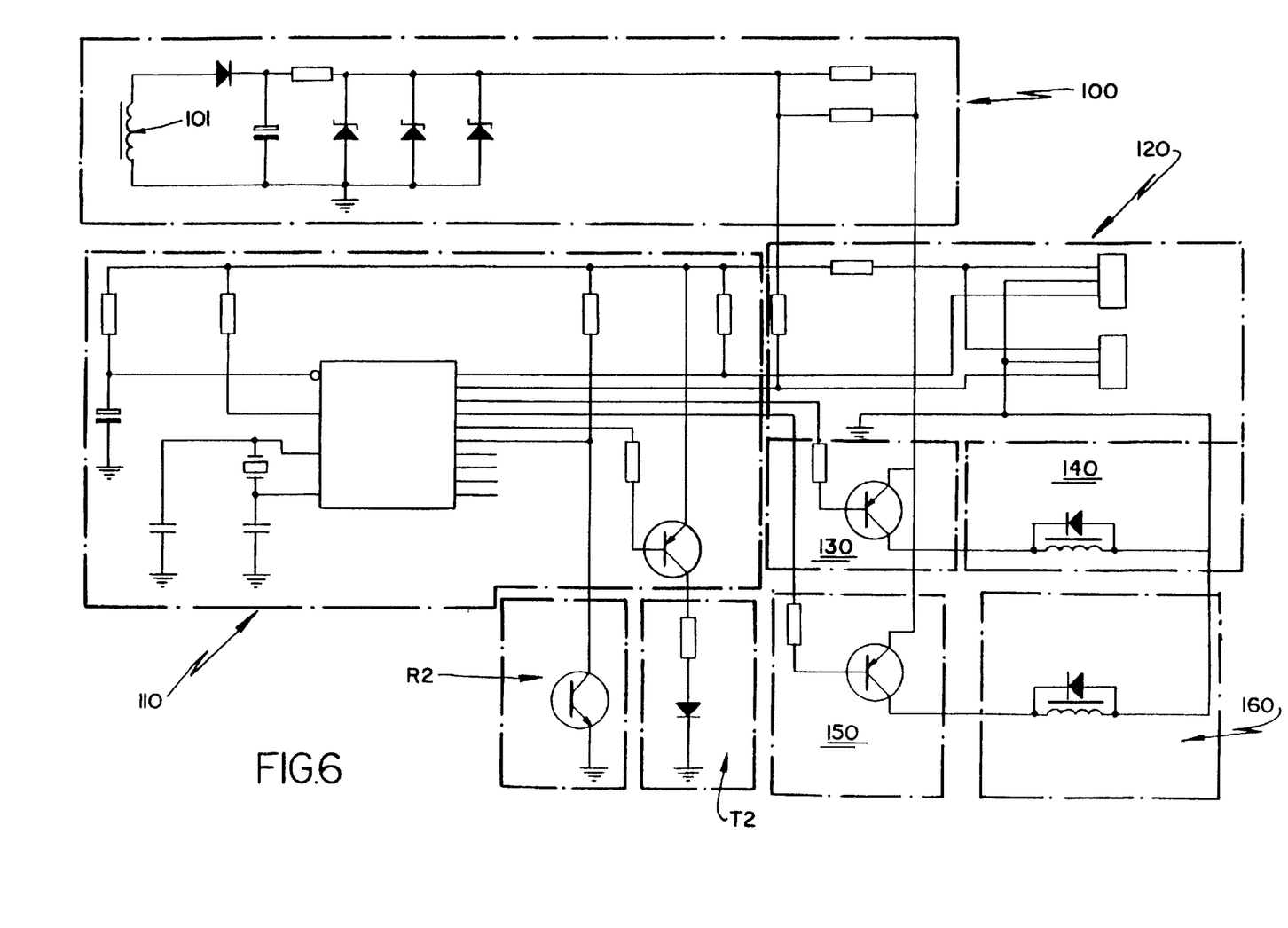
FIG. 6 illustrates an electronic circuit associated to the block diagram of FIG. 5 and provided in the filling cap.

Filling cap 10 is provided with an electronic system of energization including a cap feed circuit 100, presenting the transformer secondary L2 and a first outlet 100a, sending electric current, resulting from the energization of said secondary L2, to a first microprocessor circuit 110, provided in filling cap 10, by means of a first inlet 110a thereof.

The first microprocessor circuit 110 further presents a second and a third inlet 110b, 110c, communicating information from the position detecting circuit 120, which informs the first microprocessor circuit 110 of the open state of filling cap 10.

Figure 7:
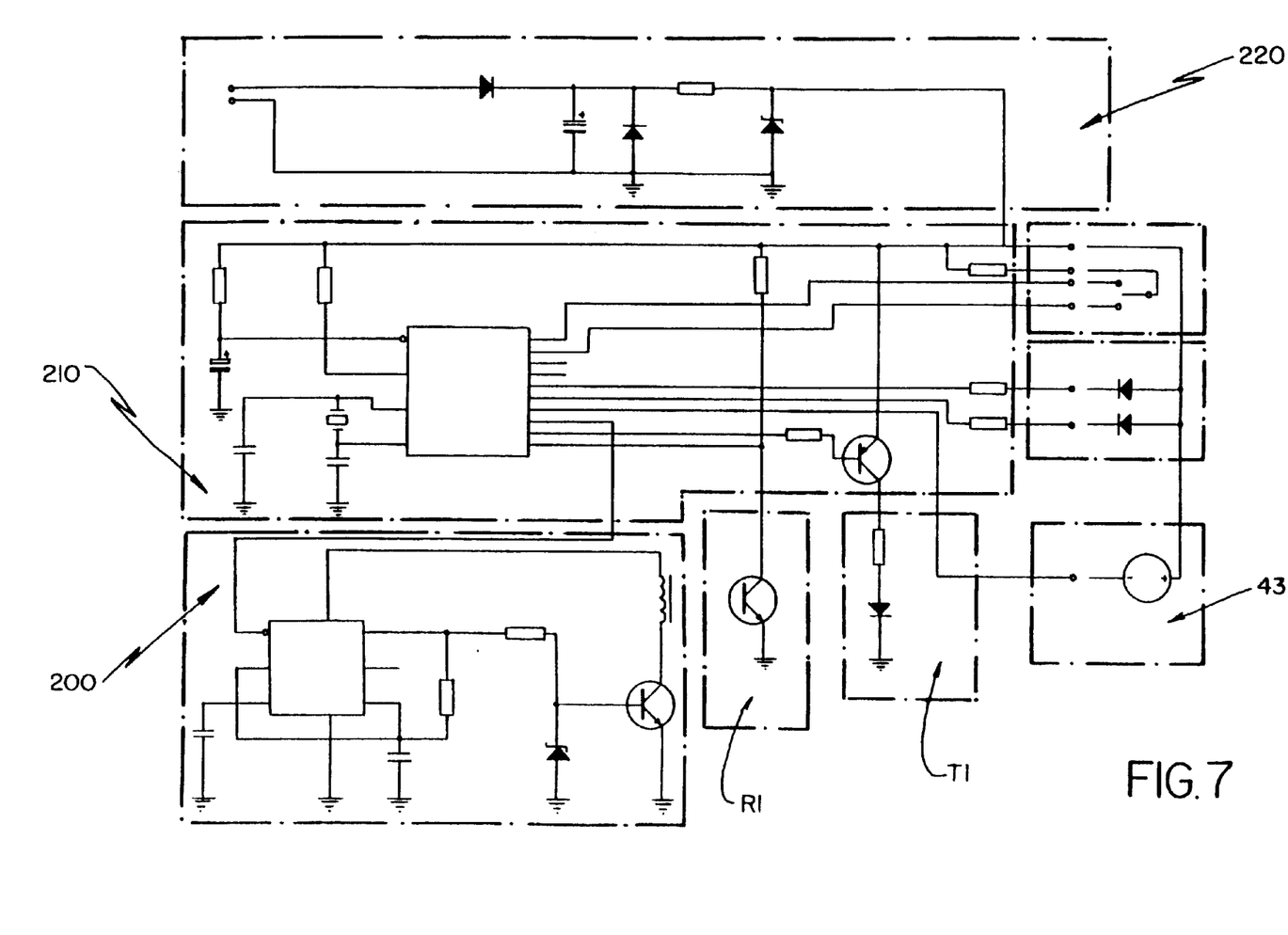
FIG. 7 illustrates an electronic circuit associated to the block diagram of FIG. 5 and provided with an electronic switch.

The transformer of the electronic switch 40 is preferably a high frequency oscillator of a power oscillating circuit 200 of said electronic switch 40 and which presents a first inlet 200*a* communicating said oscillating circuit 200 with a second microprocessor circuit 210 provided in said electronic switch 40, which receives information to command the opening or closing of filling cap 10, when optic communication between the latter and said electronic switch 40 identifies said cap as being correct and whether it is in a closed or open state.

The first microprocessor circuit 110 presents as well a fourth inlet 110*d* to receive information from the first optic transmitter T1 of the electronic activating switch 40 through the second optic receptor R2 provided in the filling cap 10 and electrically connected to the feed circuit 100 thereof and which commands the start up of the cap opening and closing operations. The second transmitter T2 of the filling cap 10 communicates to the first optic receptor R1 of the electronic switch 40 the identification data from filling cap 10, when electronic switch 40 engages filling cap 10, and the data referring to the end of the operations commanded by said activating switch 40. These data are sent to the second optic transmitter T2 of filling cap 10 by a first outlet 110*e* of the first microprocessor circuit 110 thereof which further presents second and third outlets 110*f*, 110*g* communicating respectively with inlet 130*a* of a protecting activating element 130 of the cap opening clutch assembly 140 and an inlet 150*a* of a protecting activating element 150 of the cap closing clutch assembly 160.

The communication of each protecting activating element 130, 150 to the respective clutch assembly 140, 160 is made by connecting each corresponding inlet 140*a*, 160*a* of said activating elements with the respective outlets: 130*b*, 150*b* of said protecting activating elements 130, 150.

The first microprocessor circuit 210 of electronic switch 40 presents a first inlet 210*a* receiving signal from the outlet 220*a* of a tension regulating circuit 220; a second inlet 210*b*, receiving information from filling cap 10, by means of first optic receptor R2 of electronic switch 40; a third inlet 210*c* receiving instructions from activating button 43; a first outlet 210*d* in communication with first inlet 200*a* of the power oscillating circuit 200; a second outlet 210*e* carrying instructions to first optic transmitter T1 of electronic switch 40 to be sent to the electronic circuit of the filling cap 10; a pair of third outlets 210*f*, activating the visual device 43 which informs about the opening or closing conditions of the filling cap and a fourth outlet 210*g* for activating the sound alarm device 43.

The electronic switch 40 also includes a timer which automatically interrupts the supply of energy to the oscillator if the operations to be achieved do not occur within the average time interval, which has been determined and informed to the second microprocessor 210 circuit of the electronic switch 40, preventing the system from being inadvertently left on.

We claim:

1. A system for locking filler caps, to be used especially in tanks containing inflammable liquids, said cap (10) comprising a body (11) which is seated over a respective tank nozzle (20) and articulating at least one lock arm (14) bearing a respective lock which can be displaced between locking and releasing positions relative to the nozzle, when there is a corresponding angular movement of the lock arm, wherein it comprises an arm activating assembly provided in the cap body (11) and including a drive shaft (51) mounted axially in the cap body (11) in a freely rotating manner and having one end (51*b*) accessible from the outside of the cap and to which a turning tool is attachable; at least one impelling piston (15) mounted axially through the cap body (11) so that it will have an external end (15*a*) coupled to the lock arm (14) and an internal end (15*b*) inside the filling cap (10), each of said impelling pistons (15) being axially displaceable between a first operational limit position corresponding to the lock arm locking position and a second operational limit position corresponding to the lock arm releasing position;

at least one electromagnetic clutch mounted in the cap body (11) so as to cause the selective axial displacement of the impelling piston (15) between the first and second operational limit positions upon the rotation of the drive shaft (51), said clutch comprising a coupling means, displaceable between an engaging position, in which the rotation of the drive shaft (51) causes the axial displacement of the impelling piston (15) and a disengaging position, in which the drive shaft rotates freely upon torque application;

at least one coil means (60) coupled to the cap body (11) so as to cause, when energized, the displacement of the coupling means to the engaging position;

an electronic switch (40) provided with transformer primary (L1) energized at low power and coupled to a transformer secondary (L2) mounted in the cap body (11), in order to induce in the transformer secondary (L2) enough current to operatively energize the coil means (62) of the electromagnetic clutch.

2. The system according to claim 1, wherein it comprises a movement transmitting means, constantly coupled to one of the parts defined by the impelling piston (15) and the drive shaft (51) and being selectively coupled to the other of said parts through the coupling means, so as to cause the axial displacement of the impelling piston (15) when the coupling means is displaced toward the engaging position thereof.

3. The system according to claim 2, wherein the movement transmitting means includes a pinion (30) and an endless screw (54) being at least one of said parts of the pinion (30) and the endless screw (54) constantly engaged to one of said parts defined by the impelling piston (15) and the drive shaft (51), the coupling means defining the connection mechanism between two adjacent parts of said piston-pinion-drive shaft parts.

4. The system according to claim 3, wherein the endless screw (54) and the drive shaft (51) are coaxial, the coupling means being defined by a helical spring element (63), which is disposed around the adjacent portions of the drive shaft (51) and the endless screw (54) and which has an end affixed to the drive shaft (51) and the other end to a tubular sleeve (61), which rotates together with the drive shaft (51) when the coil means (60) is de-energized and which is magnetically braked by the coil means (60), upon the energization of the latter, so as to make the helical spring (63) press said adjacent portions of the drive shaft (51) and the endless screw (54), consequently restricting the mutual rotation thereof.

5. The system according to claim 4, wherein the endless screw (54) is an externally screwed tubular element involving part of the drive shaft (51).

6. The system according to claim 5, wherein the internal end (15*b*) of the piston carries the pinion (30).

7. The system according to claim 6, wherein the pinion (30) activates, during the displacement thereof toward a second limit position, a lock pin (55) mounted in the cap body (11), so that a first end thereof reaches the electronic switch (40), engaging the latter to the filling cap (10) until the pinion (30) returns to its first limit position.

8. The system according to claim 7, wherein open and closed positions of the cap are detected by position sensing elements (S1, S2) disposed in the cap body (1I).

9. The system according to claim 8, wherein the pinion (30) further includes another position sensing element (S3) communicating with the position sensing elements (S1, S2) of the cap body (11).

10. The system according to claim 1, wherein the electronic switch (40) includes a first microprocessor circuit (210) commanding the energization of the transformer primary (L1) when informed of the filling cap operational condition by information transmitting elements (T1, T2) and receiving elements (R1, R2) provided in the respective coupling portions (10a, 40a) of the filling cap (10) and electronic switch (40).

11. The system according to claim 10, wherein the transmitting elements (T2) and receiving elements (R2) of the filling cap (10) are operatively connected to a second microprocessor (110) provided in said filling cap and which commands the selective energization of the electromagnetic clutch for opening and closing operations of the filling cap (10).

* * * * *